United States Patent [19]
Peterson et al.

[11] Patent Number: 5,553,117
[45] Date of Patent: Sep. 3, 1996

[54] VEHICULAR COMMUNICATIONS SYSTEM

[75] Inventors: Danny R. Peterson, HC75, Box 22A, Hitchcock, S. Dak. 57348; Clement A. George, III, Glenshaw, Pa.

[73] Assignee: Danny R. Peterson, Hitchcock, S. Dak.

[21] Appl. No.: 176,827

[22] Filed: Jan. 3, 1994

[51] Int. Cl.⁶ .......................... H04B 1/40; H04M 11/00
[52] U.S. Cl. .................. 379/58; 379/59; 455/76; 455/77
[58] Field of Search .................. 379/58, 59, 61, 379/63; 455/76, 77

[56]            References Cited
            U.S. PATENT DOCUMENTS

| | | | |
|---|---|---|---|
| 4,504,702 | 3/1985 | Meunter et al. | 379/110 |
| 4,515,994 | 5/1985 | Bolle et al. | 379/58 |
| 4,802,235 | 1/1989 | Treatch | 455/77 |
| 5,127,042 | 6/1992 | Gillig et al. | 379/58 |
| 5,243,640 | 9/1993 | Hadley et al. | 379/58 |

*Primary Examiner*—Edward L. Coles, Sr.
*Assistant Examiner*—Fan Lee
*Attorney, Agent, or Firm*—Daniel J. Long

[57]            ABSTRACT

Disclosed is a communications device which includes an integral cellular telephone and two-way radio. The cellular telephone and the two-way radio controlled from a common handset unit. The device has the range and relative transmission security of a cellular telephone while allowing radio transmissions to be monitored.

6 Claims, 2 Drawing Sheets

VEHICULAR COMMUNICATIONS SYSTEM

BACKGROUND OF THE INVENTION

The present invention relates to communication systems and more particularly to communications systems for use in vehicles.

The use of two-way radios for use in vehicles is well known. While such radios allow a user to monitor transmissions by several different parties at one time, they do have potential drawbacks in terms of range and transmission security. Consequently many users of two-way vehicular mounted radios have found it necessary to convert to a cellular telephone communication system.

In view of the above, it is the object of the present invention to provide a vehicular communications system which has the range and relative transmission security of a cellular telephone but which also allows the user to continuously monitor a net with a number of other transmitters.

SUMMARY OF THE INVENTION

The communications system of the present invention includes an integral cellular telephone unit combined with an integral two-way radio unit. Both units are controlled from a common handset. The handset is in circuit with the logic unit of the cellular telephone and with the frequency modulator and demodulator of the two-way radio.

BRIEF DESCRIPTION OF THE DRAWINGS

The present invention is further described with reference to the attached drawings in which.

DETAILED DESCRIPTION OF THE EMBODIMENT

Figure 1:
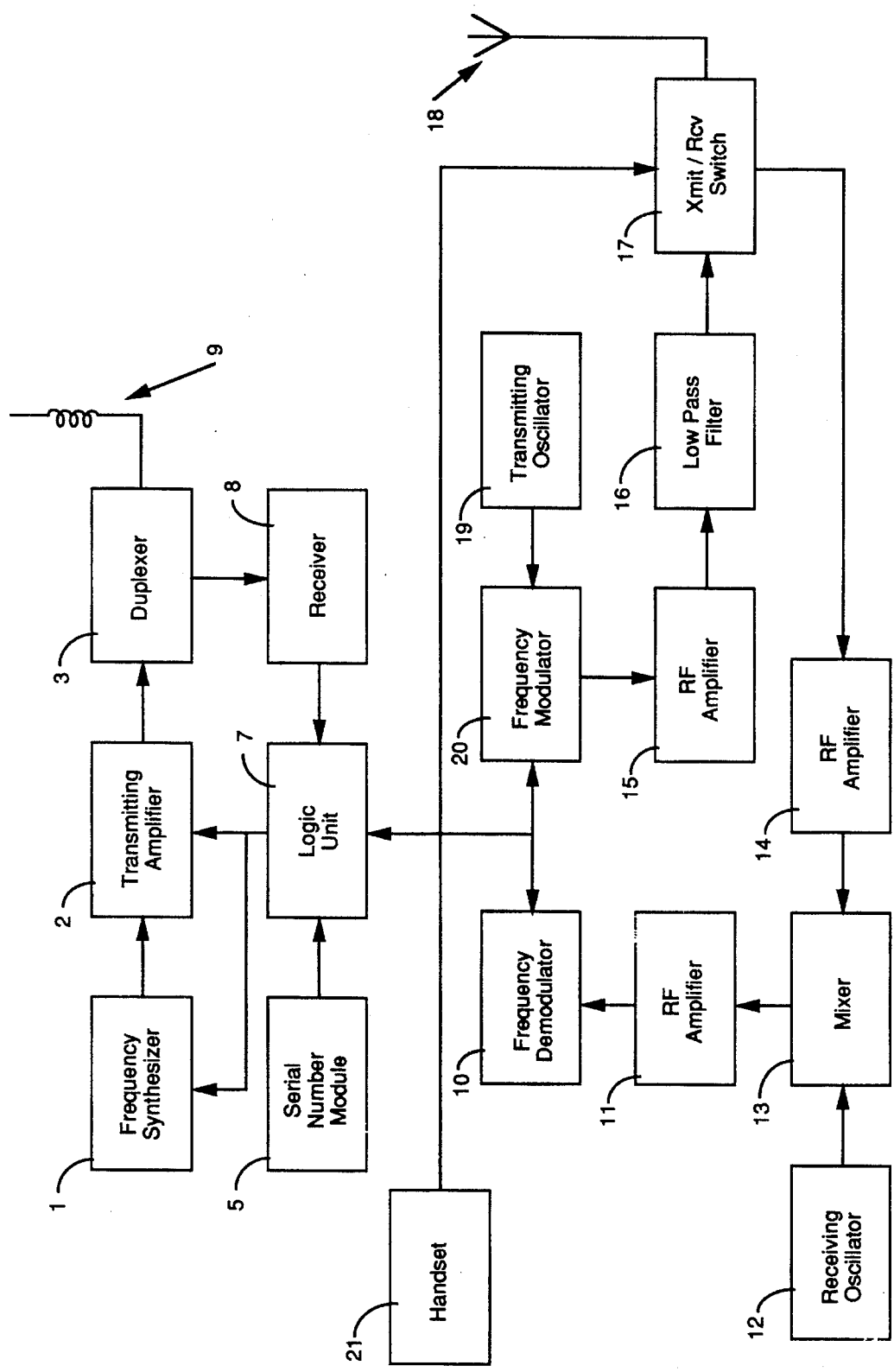
FIG. 1 is a schematic block diagram of the cellular telephone/two-way radio of the present invention.

Referring to FIG. 1, the devices shown at numerals 1–9 pertain to the cellular telephone portion or unit of the invention. Devices shown at numerals 10–20 pertain to the two-way radio portion or unit of the invention. The device 21 is the handset which is the controlling device by which the operator interfaces with the combination of the cellular telephone unit and the two-way Radio unit.

The first major element of the system of the present invention is the cellular telephone unit which is described as follows. A cellular telephone is one part of a cellular mobile radio telephone system. A cellular mobile radio telephone system is a network of relatively low-powered FM transmitters and receivers (cell sites) covering a specific land area to act as a interface between the mobile radio telephone (cellular telephone) and the local telephone company. The major component contained in the cellular telephone is the logic unit 7 which is designed to perform three functions. The three functions are: data reception and generation, management of the cellular telephone and generation of tones such as the Dual Tone Multi Frequency (DTMF) and the ringing signal generated for an incoming call. DTMF comprises the tones that are heard when depressing the numbered pushbuttons on a telephone when placing a phone call. The logic unit 7 controls the functions performed by the other devices included in the cellular telephone. To effect such control the logic unit contains a microprocessor to perform its management duties. With the selection switch of the handset 21 set to cellular telephone, the operator communicates via the handset. Any communication is sent to the logic unit 7 continued on to the transmit circuitry or from the receive circuitry. The serial number module 5 contains programmable Read Only Memory (ROM) that contains the individual telephone number and cellular phone ID. This information is used by the logic unit when placing or receiving a phone call. This module is removable for reprogramming to change a telephone number or ID number. The receiver 8 portion of the unit is designed to receive any of the assigned 666 receive channels in the 870 to 890 MHz range. It is the high frequency range of the cellular telephone that dictates separate amplifiers, transmitting circuit, receiving circuit and antenna from the two-way radio. The frequency synthesizer 5, at the direction of the logic unit 7, generates the signal that is modulated and transmitted at the correct frequency/channel. The frequency synthesizer 5 contains a frequency modulator and oscillator similar to FM transmission for the two-way radio but operating at a much wider and higher frequency range. The transmitting amplifier 2 receives the processed signal from the frequency synthesizer 5 and amplifies the signal to the required transmitting strength. The transmitting amplifier 2 produces the proper signal strength as dictated by the logic unit 7, which communicates with the cell site to determine the transmitting strength. The duplexer 3 gives the cellular telephone the ability to talk and listen at the same time. It is via the multiplexing of the transmitting and receiving signals that gives the effect of a normal conversation as with a household telephone. The duplexer 3 circuit gives the cellular telephone an advantage over a two-way radio in that a cellular telephone does not need a Xmit/Rcv pushbutton as will be seen when discussing the two-way radio. The antenna 9 for a cellular telephone is distinguishable from other antennas by the multi-turn curl at the base. These turns make up the airwound phasing coil that permits the antenna to operate efficiently on any channel or frequency throughout the 800 MHz frequency range. At such high frequencies, the length of a cellular telephone antenna is preferably less than 1 foot.

The second major element of the system of the present invention is the two-way radio unit which is described as follows. This two-way radio is a single duplex FM transceiver unit, meaning that the radio communicates via frequency modulation with only transmission or reception occurring at one time. The user switches between talking and listening via a push-to-talk pushbutton on the handset 21. To transmit, the push-to-talk pushbutton is depressed setting the transmit and receive switch (Xmit/Rcv) 17 to Xmit (transmit), connecting the antenna 18 to the transmit circuitry as at numerals 15–17 and 19–20 of the two-way radio. The user talks into the microphone in the handset 21 and the transmitted voice of the user is modulated via the frequency modulator 20. The transmitting oscillator 19 creates the transmitting frequency which is the channel that the user has selected. This two-way radio operates on 40 channels at a frequency range of 26.965 to 27.405 MHz. Once the signal is frequency modulated, it is then amplified and buffered via the RF amplifier 15. The signal is next sent through a low pass filter 16 to reduce any harmonic noise produced by the transmitting circuitry. To receive, the user releases the push-to-talk pushbutton, setting the Xmit/Rcv switch 17 to receive (Rcv), connecting the antenna to the receiving circuitry 10–14 of the two-way radio. For a simple quarter-wavelength whip antenna at optimized length and resonant frequency, the length in feet of the antenna is 469/frequency[MHz]. Therefore, if, for example, the communicating frequency is 27 MHz then the antenna would have a length of 469/27 or 17.37 feet. There are ways of physically shortening quarter-wavelength antennas, however, such means would have an effect on the resonant tuning of the antenna 18 sacrificing in gain and performance. When receiving, the incoming signal is applied to the RF amplifier 14 to buffer and amplify the signal. The signal is set to the proper bandwidth and selectivity via the mixer 13 that operates at a frequency determined by the receiving oscillator 12. The signal is buffered by the RF amplifier 11 before it is demodulated by the frequency demodulator 10. The signal is now heard by the user via the speaker in the handset 21.

Figure 2:
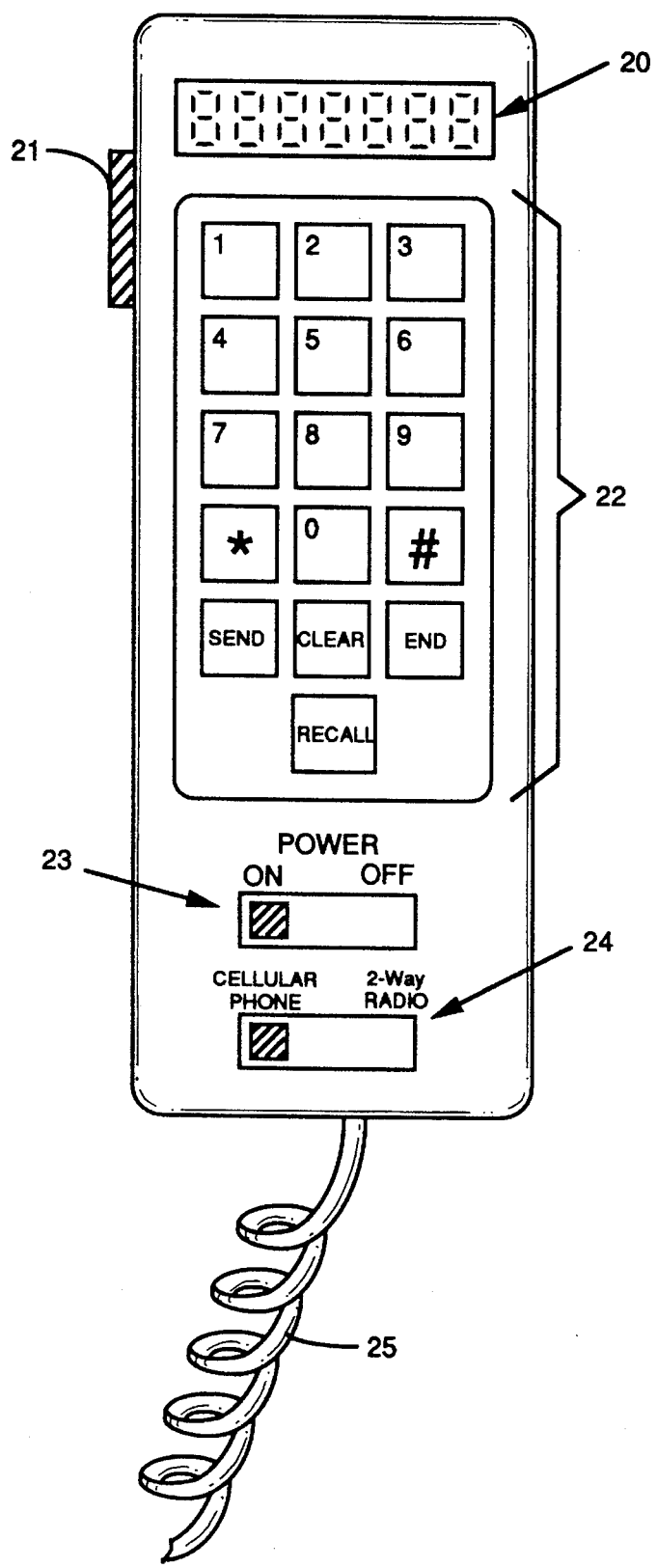
FIG. 2 is a plan view of a handset for a cellular telephone/two-way radio which may be used by the operator of this invention.

FIG. 2 illustrates a typical diagram of a handset for a cellular telephone/two-way radio. The handset is the link between the user and the unit. The handset should have at a minimum the following features. The dialed number/channel display 20 for the cellular telephone allows the user to check for dialing errors before placing a call, for the two-way radio displays the channel that the unit is tuned to. The push-to-talk pushbutton 21 is a two-way radio function only, and it is used to switch between talking and listening. The dialing pushbuttons 22 for the cellular telephone act as the pushbuttons for dialing a phone number and placing a call, and for the two-way radio, the pushbuttons are used to select the channel of communication or frequency. The power selection 23 is used to turn the unit ON or OFF for both the cellular telephone and the two-way radio. The cellular telephone/two-way radio selection 24 is used to determine use of the unit as a cellular radio or a two-way radio. The underside of the displayed view of the handset are the location of the speaker and microphone for listening and talking. Additionally, with the unit selected to cellular radio, depressing #999 enables the cellular telephone to monitor a selected radio channel on the two-way radio.

Although the invention has been described with a certain degree of particularity, it is to be understood that the present disclosure has been made only as an example and that the scope of the invention is defined by what is claimed hereafter.

What is claimed is:

1. A vehicular communications system comprising a cellular telephone unit and a two-way radio unit having a common control unit, wherein:

(a) the common control unit is a handset having means for selectively activating either the cellular telephone unit or the two-way radio unit and the handset has an integral microphone and receiver; and (b) the cellular telephone unit comprises a logic unit, a frequency synthesizer, a transmitting amplifier, a duplexer, a serial number module, and a receiver, and the cellular telephone unit receives frequencies in the range from about 870 MHz to about 890 MHZ, and the cellular telephone units receives about 666 channels, and the frequency synthesizer at the direction of the logic unit generates a signal which is amplified at the direction of the logic unit to a required transmitting strength; and (c) the two-way radio comprises a frequency demodulator, at least one RF amplifier, a receiving oscillator and a low pass filter, and the handset is connected in circuit with the logic unit if the cellular telephone and the frequency modulator and frequency demodulator, and the two-way radio unit is an FM radio operating at a frequency of from about 26.965 MHz to about 27.405 MHz, and the two-way radio unit operates on about 40 channels, and transmitted voice signals from the handset are modulated in the frequency modulator of the two-way radio unit, and in the two-way radio unit the transmitting oscillator creates a frequency for a selected channel, and the signal from the frequency modulator is amplified in one of the RF amplifiers after which the signal is sent through the low pass filter, and signals received in the two way radio unit are applied to a second RF amplifier and then to the mixer which operates at a frequency determined by the receiving oscillator after which they are buffered by a third RF amplifier after which they are demodulated by the frequency demodulator and then heard by means of the speaker in the handset, and the handset is equipped with and a power ON-OFF switch, a cellular telephone and two-way radio switch and a push button switch for transmitting on the two-way radio.

2. The communications system of claim 1 wherein the cellular telephone unit is equipped with an antenna having an airwound phasing coil.

3. The communications system of claim 2 wherein cellular telephone unit antenna is about 1 foot or less in length.

4. The communications system of claim 1 wherein the two-way radio unit have a quarter wave length whip antenna.

5. The communications system of claim 1 wherein the two way radio unit antenna has a length in feet of about the number 469 divided by the operating frequency in MHz.

6. The communications system of claim 1 wherein the handset is equipped with a dialed number/channel display and dialing pushbuttons.

\* \* \* \* \*